Figure 1:
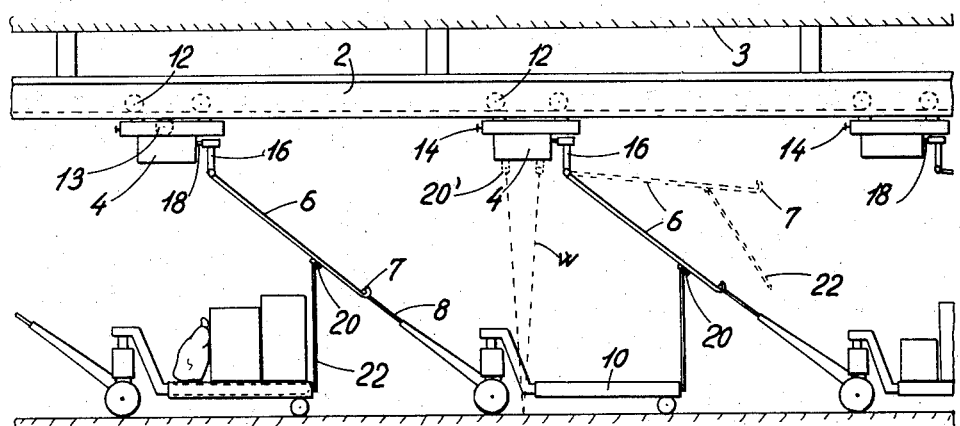

United States Patent [19]
Christensen et al.

[11] 3,828,681
[45] Aug. 13, 1974

[54] CONVEYOR SYSTEMS

[75] Inventors: Svend Christensen, Risskov; Jacob August Nielsen, Viby J., both of Germany

[73] Assignee: Crisplant A/S, Risskov, Denmark

[22] Filed: June 15, 1971

[21] Appl. No.: 153,391

[30] Foreign Application Priority Data
June 15, 1970 Great Britain..................... 28861/70

[52] U.S. Cl.................. 104/88, 104/93, 104/148 R, 104/170, 105/150
[51] Int. Cl....... B61b 5/00, B61b 7/06, B61b 13/12
[58] Field of Search........ 104/88, 89, 93, 95, 172 S, 104/148 R, 170; 105/148, 156, 150; 246/29, 30, 187 C; 191/45 A

[56] References Cited
UNITED STATES PATENTS

| | | | |
|---|---|---|---|
| 3,207,084 | 9/1965 | York.............................. | 104/148 R |
| 3,357,539 | 12/1967 | Naslund............................. | 104/88 |
| 3,451,350 | 6/1969 | Bryson............................. | 104/88 |
| 3,502,038 | 3/1970 | Wesener........................... | 104/88 |
| 3,502,039 | 3/1970 | Patterson........................ | 104/172 S |
| 3,552,321 | 1/1971 | Priebe................................ | 104/88 |
| 3,598,059 | 8/1971 | Carney et al. .................... | 104/88 |
| 3,625,158 | 12/1971 | Lorenz et al...................... | 104/93 |

*Primary Examiner*—Drayton E. Hoffman
*Attorney, Agent, or Firm*—Craig & Antonelli

[57] ABSTRACT

A conveyor system comprising guide rails for a plurality of each of dogs which are provided with a driving motor so as to be individually driven along the guide rail. The dogs releasably connected to load carrier vehicles so as to pull these vehicles along between loading stations and unloading stations in which the vehicles may be released from the dogs. A spacing control arrangement is provided for maintaining sufficient spacing between consecutive vehicle loaded dogs according to the space requirements of the vehicles. The spacing control arrangement is rendered inoperative between an idle dog and the foregoing or following dog so as to enable an idle dog to catch up with a foregoing dog or to be caught up by a following dog. The system is well suited for automatic sorting conveyors, since the individually movable dogs may be guided over rail switches to any desired unloading station.

23 Claims, 9 Drawing Figures

PATENTED AUG 13 1974　　　　　　　　3,828,681

SHEET 1 OF 2

INVENTORS
SVEND CHRISTENSEN,
JACOB AUGUST NIELSEN

BY Craig, Antonelli & Hill
ATTORNEYS.

CONVEYOR SYSTEMS

The present invention relates to a conveyor system of the kind comprising a guiding rail for a plurality of driving units, so-called dogs, which are adapted to drive along the rail and to be connected to load carrier vehicles such as wheel supported carts, whereby these carts are pulled along a track following the rail between one or more loading stations and one or more discharging stations. Normally, the load carriers are releasable from the dogs so that when a certain load carrier reaches a certain discharging station corresponding to the destination of the articles on the carrier, the carrier may be disengaged from the dog which may thereafter return to the loading station while the carrier may be unloaded in the discharge station. When unloaded, the carrier may be coupled to any free or idle dog passing the unloading station and thereby be brought back to the loading station.

In most of these systems the dogs move along an overhead rail and have a depending pulling rod to which the said carts may be releasably connected so as to be pulled forwardly on the floor underneath the rail. In the known systems the dogs are mounted on a driving chain with constant spacing between consecutive dogs.

Normally, the dogs are shorter than the load carrier carts, so the distance between consecutive dogs shall be sufficient to provide for reasonable spacing between consecutive carts. However, since there is usually a considerable number of idle dogs moving in the system the practical top capacity of the system, with a given length and a given number of dogs, is smaller than the theoretical top capacity; in other words, the rail length or the number of dogs is bigger than necessary for the practical capacity.

It is the purpose of the invention to provide a system in which the rail length may be reduced compared with a system as described above, without a corresponding reduction in the practical capacity of the system. A further important object of the invention is to provide a conveyor system which is well suited for automatic operation.

Still a further object of the invention is to provide a conveyor system in which the guiding rail may be constituted by a complex rail system comprising a number of rail sections interconnected by means of rail switches enabling the dogs to pass between the different sections, whereby it is possible to guide idle dogs to places in which they are needed without necessarily letting the idle dogs move in a closed circuit together with vehicle loaded dogs.

According to the invention the dogs are driven by individual motors, and control means are provided for ensuring an optimal minimum spacing between consecutive dogs in response to the dogs being operative as load carrier driving means whereas means are provided for making said spacing control means inoperative in response to the particular dog or the foregoing or following dog being disconnected from its associated load carrier. Hereby it is possible to "store" idle dogs close to each other, and to introduce additional idle dogs between spaced vehicle loaded dogs, so that the average number of dogs per length unit of the entire rail can be increased. A very important advantage is that the feeding line for idle dogs to the loading station may hold a large number of dogs without having any considerable length. Another important advantage is that with the self propelled dog it is possible to use a complex rail system in which the dogs may move over rail switch means from one rail section to another; since such rail switches are easy to automatically control, e.g., by destination code means following the dogs, the conveyor system according to the invention will be perfectly suited for automatic operation, at least as far as the guiding of the dogs to the desired places is concerned. Also the disconnection of the vehicles from the dog in the selected unloading stations may be effected automatically by means of a destination code responsive releasing arrangement, but this arrangement does not form part of the present invention.

Figure 2:
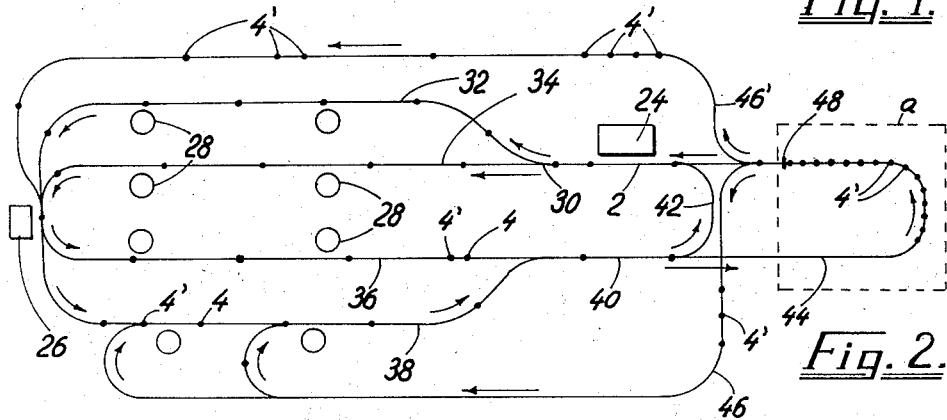
Figure 3:
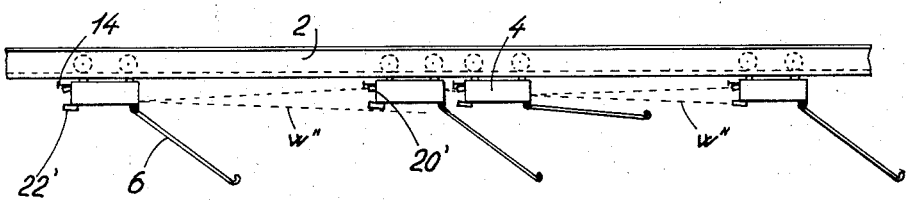
Figure 4:
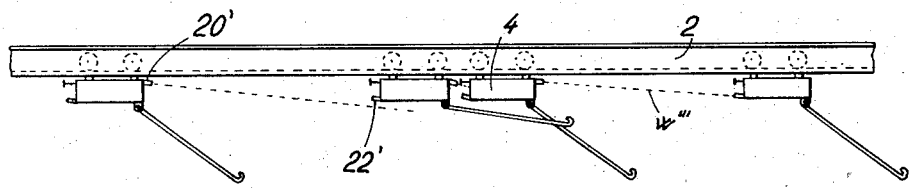
Figure 5:
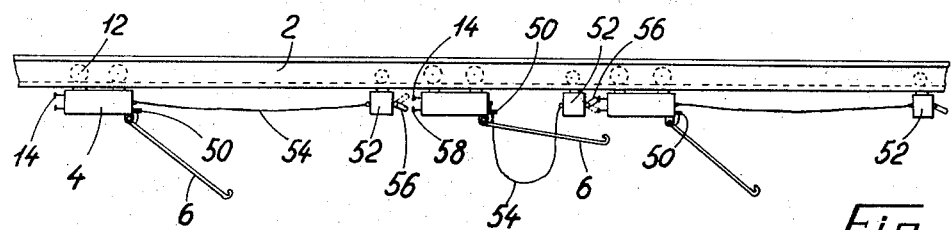
Figure 6:
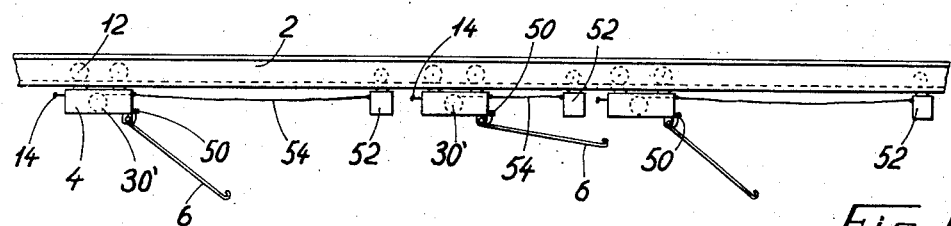
Figure 7:
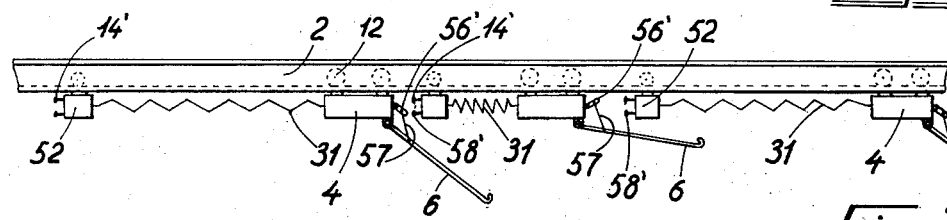
Figure 8:
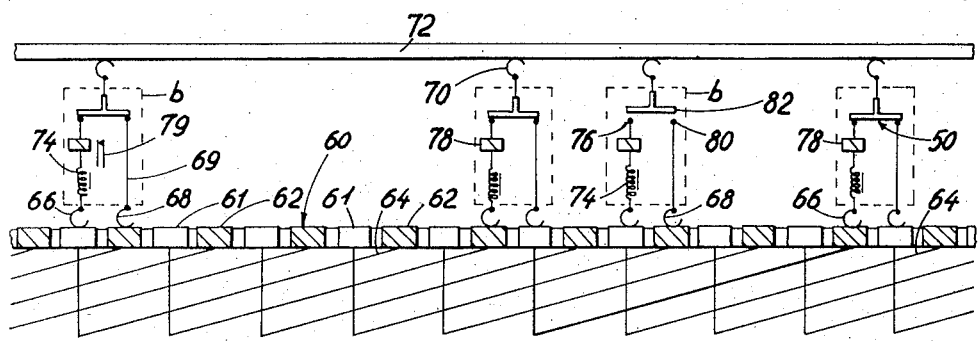
Figure 9:
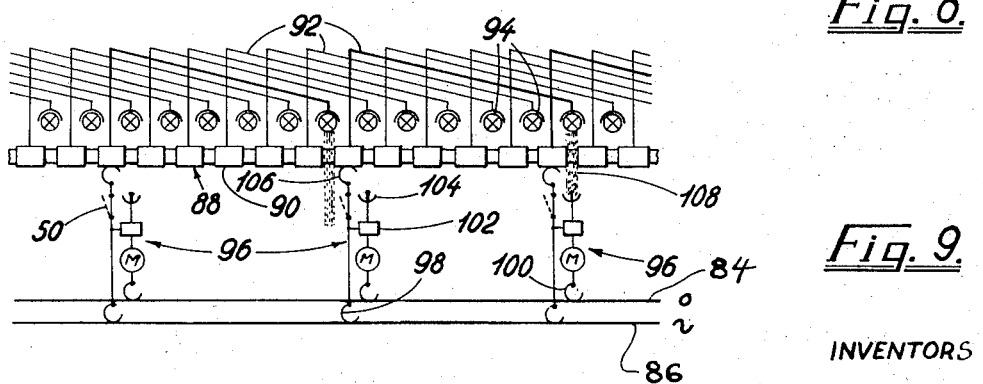

In the following the invention is described in more detail in connection with some examples shown in the accompanying drawings, in which:

FIG. 1 is a schematical side elevation of a conveyor system, according to an embodiment of the invention, FIG. 2 is a schematical top view of this system FIG. 3 is a schematic side view of another embodiment of the driving dogs, FIG. 4 is a corresponding view of a third embodiment FIG. 5 is a corresponding view of a fourth embodiment FIG. 6 is a corresponding view of a fifth embodiment FIG. 7 is a corresponding view of a sixth embodiment FIG. 8 is a schematic view of a driving control system for use in still a further embodiment of the invention, and FIG. 9 is a schematical view of a modification of the system shown in FIG. 8.

FIG. 1 shows an overhead conveyor rail 2 mounted under a ceiling 3 and serving to carry a number of pulling dogs 4 provided with depending pulling rods 6 each acting as a connecting rod to the handle 8 of a wheel supported cart 10. As well known in such systems the rods 6 have at their lower ends a hook or an eye 7 adapted to releasably hold a hook on the cart handle 8 so as to enable an easy attachment to and detachment from the carts. The rods 6 are swingably secured to the dogs 4 and biased so as to change their position relatively to the dogs when they are in disengaged condition, preferably by swinging up to a raised position as shown in dotted lines in FIG. 1.

In the system according to the invention the dogs 4 are provided with carrier wheels 12 rolling on flange means on the rail 2 and with individual driving motors (not shown) energized by means of a contact rail and sliding shoe arrangement (not shown) and serving to drive one or more of the wheels 12; alternatively the driving motors may serve to drive a friction wheel 13 rolling against the lower side of the rail 2. Each dog 4 has a front end switch 14 serving to stop or at least slow down its driving motor when running up into the foregoing dog. The pulling rod 6 of each dog is pivotally secured to the lower end of a downwardly protecting arm 16 the upper end of which is laterally swingably connected to the dog 4 by means of a shaft 18. It is hereby ensured that the pulling force between the dog and cart 10 will always be directed almost exactly against the area of driving engagement between the dog and the rail 2, also when the cart is advanced along a curved rail section.

On each pulling rod there is mounted a switch 20 having an actuator rod 22 hanging down therefrom. The switch 20 is connected with the driving motor of the particular dog so as to allow the motor to run when the rod 22 hangs freely down, but stop the motor when the rod 22 is swung rearwardly, relatively to the moving direction of the dogs. This means that the driving motor of the dog of a particular cart will stop when or if the cart, as illustrated in FIG. 1, catches up with a foregoing cart, irrespectively of whether the foregoing cart is loaded or unloaded. In order to prevent the motor from rapidly starting and stopping if its associated dog is liable to run a little faster than the foregoing cart a time delay unit may be interposed between the switch 20 and the motor, whereby the motor will not stop until the switch has been actuated for e.g., some seconds.

It will be appreciated that with the arrangement described the dogs 4 may pack closely together when they are out of actual use, e.g., when directed to a special accumulation rail section, whereas when they are in use they will automatically maintain the prescribed minimum spacing necessary for the carts. If an idle or loaded dog is stopped in any position, e.g., at the front end of the said dog accumulation rail section a following dog will not be stopped until its front end switch 14 engages the rear end of the foregoing dog.

The switch actuator rods 22 may be substituted by other means designed so as to detect the presence of a foregoing cart in the minimum distance from the following cart. These means, by way of example, may be constituted by an ultrasonic transmitter and receiver unit 20' mounted on the dog 4 and sending an ultrasonic wave $w$ at an oblique angle down to the floor from which it is reflected to be received by the receiver and thus detect that no foregoing cart is present thereneath. When a foregoing cart becomes present the level of reflection will be raised whereby the reflected wave will no longer hit the receiver unit; the corresponding change in the output signal of the receiver may be utilised in well known manner to cause the driving motor to stop so that the dog and the cart do not start again until the foregoing cart or other obstruction has disappeared from the position on the floor underneath the detecting device.

With the self-propelled dogs and the possibility of storing the idle dogs closely together it is possible to work with differentiated rail systems in which special rail sections are adapted to receive and accumulate idle dogs for later delivery of dogs to one or more of the loading stations. If the dogs, as in known systems, were bound to move with constant mutual spacing corresponding to the said normal minimum spacing it would be almost impossible or at least very expensive to make use of a special accumulation line for a considerable number of dogs, and the arrangement could not be practiced if the dogs were permanently interconnected by means of a driving chain, as normally used in the prior art.

The end stop switches 14 may be substituted by mechanical actuator means for lifting the contact shoes of the dogs away from the power supply contact rails in response to a dog catching up with a foregoing dog, whereby the electrical switch means are constituted by the sliding shoes themselves. A system of this kind is described in commonly assigned United States copending patent application Ser. No. 881,146, now U.S. Pat. No. 3,637,066.

FIG. 2 illustrates an example of a complex system according to the invention. It comprises a main loading station 24 in which incoming goods are to be loaded as to the conveyor carts, an auxiliary loading station 26, and several unloading stations 28 corresponding to several destinations of the goods e.g., different lorry loading stations. The rail 2 passes the primary loading station 14 and is thereafter at a rail switch 30 divided into two sections 32 and 34; the individually driven dogs may be guided into anyone of the sections by means of suitable rail switch control means as known per se. Normally at least some of the carts will be disconnected from the dogs in the stations 28 along these rail sections, so at least some idle dogs will thereafter pass the auxiliary loading station 26 in which they may again be connected with loaded carts, and therefrom move further along any of the rail sections shown at 36 and 38. These sections continue in a common return section 40 from which dogs with empty carts are advanced to the loading station 24 through a rail section 42, while idle dogs are moved into a reservoir line 44 shown within the frame $a$. If the supply of dogs with empty carts along the rail section 42 to the loading station 24 does not fulfill the requirements at this place it will be possible to cause idle dogs from the reservoir line 44 to move to the loading station 24, in which the idle dogs may be connected to new carts. Rail sections 46 and 46' are branched off from the reservoir line 44, and as indicated these rail sections will enable idle dogs 4' to be delivered to either the auxiliary loading station 26 or some of the unloading stations 38; at these places the idle dogs may be wanted either for moving new loaded carts further in the circuit or for bringing empty carts back to the loading station. The manner in which the dogs are selectively directed into the different rail sections in accordance with the requirements, more or less automatically, does not in itself form part of the present invention, but it will be appreciated that basically the same control principles may be used as already well known in connection with automatic sorter conveyors operating with individual destination code settings for the single units handled by the sorter conveyor.

The first of the idle dogs 4' in the section 44 may be stopped at 48 either by means of a retractable stop member (not shown) situated at this place so as to be hit by the front end switch 14 of the dog or by means of a temporary electrical disconnection of the power supply contact rail portion adjacent this position. Each following dog will then be stopped automatically by means of the switch 14 as it runs up to the foregoing stopped dog. In order to release one or more dogs from the accumulation line it is then sufficient to cause retraction of the said stop member or energisation of the said contact rail portion for as long a time as required for permitting the desired number of dogs to leave the accumulation line; all following dogs will also start moving hereby, but they will be stopped again when the first of them is stopped in position 40. It will be appreciated that the accumulation line 44 need not be very long in order to hold a considerable number idle dogs.

In case of a single closed guiding rail circuit the advantage of the idle dogs being able to run closely together would not be of particular importance as long as the vehicle loaded dogs continue to move with constant speed. In such a system the overall capacity might be increased if provisions were made for accelerating any loaded dog following an idle dog or following any dog spaced more than the operational minimum distance therefrom, but such an arrangement does not seem attractive. In a more complex guiding rail system, however, the use of rail switches and rail junctions between several rail sections makes it possible to take expressed advantage of the automatic spacing control means, since it is possible to "fill in" empty or loaded dogs in a certain rail section as soon as there is space enough between consecutive dogs in their section. Also when a dog is stopped in front of a rail junction in order to wait for a dog to pass the junction from another rail section (such stops being easy to arrange for in an automatic manner according to known principles) it will be advantageous that the dogs behind the stopped dog may continue their motion if there are several idle dogs therealong which have until then maintained their normal spacing from the adjoining dogs. Hereby the system will be very flexible so that its capacity can be increased.

In the system shown in FIG. 1 the normal minimum spacing is detected between a dog and the rear end of the foregoing cart. However, this spacing may also be detected directly between consecutive dogs in case the system operates with carts of uniform size. By way of example as shown in FIG. 3 an ultrasonic detector on each dog may be arranged so as to send its waves $w''$ forwardly rather than downwardly whereby the receiver unit is adjusted so as to receive the wave reflected from the foregoing dog, when the two dogs are spaced the minimum distance from each other; the received signal can then be used to stop the dog until the signal again disappears in response to continued movement of the first dog; obviously a similar arrangement may be used with other kinds of wireless signals. Alternatively, as shown in FIG. 4 each dog may have a transmitter 20', e.g. a light source cooperating with a receiver 22' of a following dog and a corresponding receiver 22' cooperating with a transmitter 20' of a foregoing dog; in this case, of course, the receiver should respond in the correct distance from the transmitter, e.g., by means of the signal wave $w'''$ having an oblique direction relatively to the moving direction of the dog.

In the system of FIG. 1 the switch actuator rods 22 serve two purposes, namely to ensure correct minimum spacing between consecutive cart loaded dogs and to detect the presence or absence of a foregoing cart so as to enable the dogs to move closely together if the foregoing dog runs idle. When spacing control means are used directly between the dogs as illustrated in FIGS. 3 and 4 it is necessary to use additional detector means in order to register whether or not there is a cart (loaded or unloaded) connected to the foregoing dog and to make the spacing control means inoperative in response to detection of the foregoing dog being idle. This detection is obtainable in a variety of manners but presumably the simplest and safest is to provide each dog with an electrical switch and use the pulling rod 6 as an actuator means for this switch in such a manner that the switch is actuated when the rod 6 is swung between its low operative position and its high inoperative position. The idle dog may then run close together when the switch is connected in the circuit so as to cancel the operation of the spacing control means thereby stopping the operation of the transmitters 20' and/or the receiver 22', in response to the rod 6 being swung upwardly. The detector switch may be mounted anywhere on the dog where it can be operated by virtue of the driving conditions of the dog changing between idle and loaded. The detector switch may be responsive to pull in the rod 6, or to the presence of the upper end of the cart handle 8 in the hook or eye 7, or to decreased power consumption of the driving motor. The detailed arrangement of these switch means should need no further description, since it will be appreciated by any skilled persons that it is very easy to design an operative arrangement of this nature.

In the system shown in FIG. 5 there is such a detector switch 50 mounted on each dog 4 so as to be actuated by the pulling rod 6 swinging up to its raised, inoperative position. In this embodiment the spacing control means are arranged as electromechanical means arranged directly between the dogs and includes an afterrunner 52 connected to each dog by means of a pulling wire 54. Adjacent its rear end the afterrunner or puppy 52 is provided with a projecting switch actuator 56 for cooperating with a pair of switches 14 and 58 on the leading end of the following dog. Both these switches control the motor of the dog 4 so as to switch off the motor as long as one of them is pressed in by the actuator 56. The actuator 56 is automatically shiftable between a position in which it can actuate the switch 14 and a position, shown in dotted lines, in which it can actuate the switch 58. This automatic shifting of the actuator 56 being caused by an electrical signal through the wire 30 in response to the feeler switch 50 being operated when the dog 4 is swung down for connection with a cart 10. The switch 58 is only biased slightly so that it will be operated as soon as it runs into the actuator 56 when the actuator assumes its lower position, since the switch bias is not sufficient to press away the puppy 52. Thus if the first dog 4 is pulling a cart the actuator 56 will assume its swung down position and be able to actuate the switch 58 of the following dog so as to prevent the following dog from getting closer to the first dog than corresponding to the position of the puppy. The switch 14 is stronger biased so that if the actuator 56 is in its raised position responsive to the first dog being idle and is hit by the switch 14 the switch bias will overcome the resistance of movement of the puppy 52 whereby the following dog will continue its movement relatively to the first dog and press the puppy 52 along in front of itself. As a result of this continued movement of the following dog, the wire 54 will be slackened and the puppy 52 eventually pressed against the first dog. The bias of the switch 14 is not sufficient to also press the first dog forwardly, so thereafter the switch 14 will be operated so as to stop the motor of its dog in response to catching up with the foregoing, idle dog, thereby resulting in the dogs being brought closely together only with the puppy 52 located therebetween.

With slight modifications of the systems it is also possible to make the switch 58 inoperative in response to its own dog being idle, whereby the idle dog may catch up with a foregoing loaded dog in order to minimize the space requirements. Another possibility which is illustrated in FIG. 6 is to cause a retraction or winding up of the wire 30 on a reel 30' in a dog 4 in response to the dog being disconnected from its cart i.e., in response to the switch being actuated. In this further embodiment the special switch actuator 56 as well as the extra end switch 58 will be superfluous; on the other hand, the end switch 14 should have relatively small bias so as to be operable by engaging the foregoing puppy without pushing the puppy away.

Still a further alternative is shown in FIG. 7 in which the dogs push their puppies in front of them by means of a resiliently compressible pushing connection 31. In this further embodiment the control system corresponds, in an inverted manner, to that shown in FIG. 5, including a switch actuator 56' mounted on the rear end of the dogs so as to be shiftable between its upper and lower positions in response to the pulling rod 6 swinging downwardly and upwardly, respectively. Motor control switches 14' and 58' are mounted adjacent the front end of the puppy so that the light bias switch 58' will be actuated when the puppy catches up with the foregoing dog, in case this dog is loaded; otherwise the following dog will continue its movement until the heavy bias switch 14 is pressed against the actuator 56' by virtue of the driving power of said following dog being transmitted thereto directly through the compressed resilient means 31 and through the puppy. In this case the shifting of the actuator 56' may be effected by a direct mechanical connection to the pulling rod 6 as shown schematically at 57 in FIG. 7.

FIG. 8 illustrates a system in which the spacing control between the loaded dogs is not effected by virtue of a direct detection but by means of a driving control system including means for continuously cutting off the power supply to a following dog a certain distance behind the foregoing loaded dog, so that the following dog, at least when loaded, cannot catch up with the foregoing dog. Apart from the power supply contact rail, there is provided a control rail 60 which is divided in mutually insulated alternating contact sections 61 and 62, respectively. By means of wires 64 the single sections 61 are connected each to a single section 62 spaced a certain distance behind the corresponding section 61. Each dog, represented by the frame lines b, is provided with a pair of sliding shoes 66 and 68 mounted so as to contact adjacent sections 61 and 62 individually as the dog moves along the rail 60 with a sliding shoe 70 contacting an uninterrupted contact rail 72. Furthermore, each dog is provided with a transformer having its primary winding (not shown) connected to the power supply contact shoes of the dog while the secondary winding 74 is connected at one end to the sliding shoe 66 and at the other end to a switch terminal 76 through a relay 78. This connection serves to control a switch 79 provided in the power supply circuit of the dog motor to stop the motor when the relay 78 is energised.

Through a wire 69 the sliding shoe 68 is connected directly to a switch terminal 80 adjacent the terminal 76. Across these terminals there is a contact bar 82 which is permanently connected to the upper sliding shoe 70. The entire assembly 76, 80 and 82 constitutes a loading detector switch 50 as shown in FIG. 5; in this case the switch is closed, i.e., the terminals 76 and 80 are interconnected by the contact bar 82 and in common connected to the shoe 70 when the dog is loaded, while the switch is open, i.e., the bar 82 disconnected from both terminals 76 and 80 when the dog is idle.

It will be understood that with the described electrical block system the sliding shoe 68 of each loaded dog when situated in connection with one of the rail sections 61, will cause a rail section 62 in the normal minimum distance behind the dog to be connected to the rail 72 through the wire 64 and, the wire 69, and if the following dog runs into this position, its sliding shoes 66 will contact the particular section 62 whereby the relay 78 will be energised if the switch 50 is closed. Thus the loaded dog will stop until the first dog has moved further forwardly and caused the particular wire 64 to be disconnected from the contact rail 72. If the dog is not loaded the relay 78 cannot be energised, so then it may catch up with the first dog. The idle dog will not have its sliding shoe 68 connected to the rail 72, so it cannot cause the next following dog to stop in the normal spacing therebehind, i.e., the next following dog may catch up with the idle dog irespectively of whether or not it is loaded. When the shoes 68 contact the sections 62 the corresponding sections 61 forwardly thereof will be connected to the rail 72, but this will happen behind a foregoing loaded dog so it will not cause the foregoing dog to stop. Besides, in the stopped positions of the dogs the shoes 68 will be in contact with sections 61 and not with sections 62 while vice versa for the shoes 66. Care could be taken, therefore, that the dogs should be stopped with the sliding shoes in these positions also in connection with mechanically effectuated stops such as in position 48, FIG. 1, or in front of rail junctions or other places where it may be desired to stop a dog temporarily independently of the immediate presence of any foregoing dog.

In situations where it is sufficient to work with less than the normal minimum spacing in the idle dog accumulation lines only, it will be possible to avoid the detector switches 50 and use the control rail 60 only outside these lines whereby the spacing control means are simply not used in the accumulation lines.

It is an important aspect of the invention that the lack of spacing control in the accumulation lines may thus be obtained simply by lack of spacing control means at these places, no matter whether the spacing of the dogs in the remaining system is permanent or individually depending on a detection of the concerned dogs being loaded or not. In practice it is preferred to work with non-permanent spacing between the dogs since the capacity of the entire system, especially when the operation thereof is automatically controlled, will hereby be increased.

The invention is not limited to the embodiment shown and described; the overhead rail structure 2 may be substituted by a corresponding system mounted in the floor. Additionally and in case of a overhead system, the carts may be substituted by containers hanging down from the dogs. Especially the block system according to FIG. 8 may be widely modified within the scope of the invention, for example by causing each loaded dog to continually switch on a light signal a certain distance behind it and letting the following dog detect the light. The light signal may be a transverse light beam, and be operable to stop a dog when it comes up to the light. Such a system is schematically illustrated in FIG. 9 in a view corresponding to FIG. 8.

In FIG. 9 is shown a contact rail system 84 and 86 for the power supply to the dog motors M, the rail 84 being the zero rail and the rail 86 the phase rail. There is arranged a further contact rail 88 divided in mutually insulated sections 90 which are each, through a wire 92, connected to an electric lamp 94 some distance behind the particular section 90. In a manner not shown, all the lamps 94 are in common connected to zero through the associated individual wire 92. Three dog units are shown, each designated 96. Each unit comprises sliding shoes 98 and 100 for contacting the phase rail 86 and zero rail 84, respectively. These sliding shoes are connected to the two sides of the motor M through a signal from an associate photo cell 104. The sliding shoe 98 is directly connected to a sliding shoe 106 which slides along the contact rail 88. The lamps 94 are arranged so as to send their light in a beam 108 crosswise of the rails, and the photo cells 104 are adapted so as to receive light from this direction only.

In a given position of a dog the corresponding lamp 94 therebehind will be energised through its wire 92 by virtue of the interconnected sliding shoes 98 and 106 connecting the particular contact rail section 90 with the phase rail 86. A following dog coming up to the position of the particular lamp will detect the light therefrom by means of the photo cell 94, and its said amplifier will thereby operate the relay switch 102 so as to stop the motor M, which will then remain stopped until the light disappears by the continued motion of the first dog.

The system just described will serve to maintain an operational minimum spacing between the dogs under all conditions, consequently, this system is used only outside the said special dog accumulation lines. When it is desired to work with selective spacing according to the dogs being loaded or unloaded, respectively, it is easy to use the load detector switches 50 for causing the sliding shoes 106 to be disconnected from the phase rail 86 in response to the particular dogs being unloaded, whereby they will not make the lamps 94 light behind them so that the following dogs are not stopped. Alternatively or concurrently the switches 50 may be inserted between the photo cells 104 and the relay switches 102 so as to make the relay switches nonsensitive to light from the lamps 94 when their associated dogs are unloaded.

It will be understood without further detailed description that the lamps 94 may be substituted by electromagnetically operated mechanical means shiftable between an inoperative position and an operative position in which they are engageable by suitable sensing means such as the end stop switches 14 used instead of the photo cells 104. Another straight modification would be to let the lamps 94 represent sections of a further contact rail engaged by sliding shoes corresponding to or substituting the photo cells 104, whereby the relay switches 102 would be actuated by current directly from the phase rail 86.

What is claimed is:

1. A conveyor system comprising: movable carrier vehicles, guiding rail means for guiding the movement of said movable carrier vehicles, a plurality of driving members mounted on said guiding rail means and movable there along, means for releasably connecting a respective driving member to a respective movable carrier vehicle in order to move these vehicles along a track corresponding to the path of movement of the respective driving member, loading station means and a plurality of unloading stations, said movable carrier vehicles being movable between said loading station means and said unloading stations, said movable vehicles being selectively released from said driving members at said unloading stations, said driving members being provided with driving motors so as to be individually driven along said guiding rail means, spacing control means operatively connected with said driving members for insuring a normal operational minimum spacing between consecutive vehicle loaded driving members, and means operatively connected with said spacing control means for rendering said spacing control means inoperative between an unloaded driving member and the foregoing or following driving member, at least along selected lengths of said guiding rail system means to permit unloaded driving members to move together to absolute minimum spacing.

2. A conveyor system according to claim 1, wherein each of said driving members is provided with sensing means for directly detecting the presence of the rear end of a foregoing carrier vehicle when a driving member is spaced from a foregoing driving member at a distance corresponding to said normal operational minimum spacing, said sensing means being operatively connected to said driving means of said driving members to decelerate said driving member in response to said sensing means being actuated.

3. A conveyor system according to claim 2, wherein each driving member is provided with stop means for stopping its driving means in response to said driving member catching up with a foregoing driving member.

4. A conveyor system according to claim 2, wherein said sensing means comprises a mechanical feeler member extending into the path of movement of said carrier vehicles and wherein a controlling switch means is provided for each driving motor, said mechanical feeler member being operable to directly acutate said controlling switch means in response to mechanical contact of said feeler member with a foregoing carrier vehicle.

5. A conveyor system according to claim 2, wherein said sensing means includes transmitter means for transmitting a directional signal and receiver means for receiving said signal provided on each of said driving members, said transmitter means being disposed on said driving members to direct said signal toward said carrier vehicles whereby said receiver means receives said signal selectively in response to change between presence and absence of a carrier vehicle connected to a foregoing driving member in a predetermined position relative to the following driving member.

6. A conveyor system according to claim 1, wherein each driving member is provided with means for detecting the presence of a carrier vehicle connected to said driving member, and wherein means are provided for operatively connecting said detecting means to said spacing control means whereby said spacing control means is rendered inoperative in response said driving member being disconnected from its associated carrier vehicle.

7. A conveyor system according to claim 6, wherein each of said driving members is provided with a pulling rod, one end of said pulling rod being pivotally secured to a respective driving member, and the other end thereof being provided with said means for releasably connecting said driving member to said carrier vehicle, means for biasing said pulling rod relative to a respective driving member so as to swing said rod away from its normal pulling direction when said rod is disconnected from a respective carrier vehicle, and wherein switch means are provided on each of said driving members for controlling said driving motors, said pulling rod being operatively connected to said switch means to actuate said switch means when swinging away from said normal pulling direction, said switch means constituting said detecting means.

8. A conveyor system according to claim 6, wherein said spacing control means include means for detecting said normal operational minimum spacing between consecutive driving members.

9. A conveyor system according to claim 8, wherein switch means are provided on each of said driving members for controlling said driving motors, and wherein said means for detecting said normal operational minimum spacing includes further members movably mounted on said guiding rail means, and means for connecting a respective further member to each of said driving members, each driving member being adapted to pull a respective further member a predetermined distance therebehind, each of said further members being provided with switch actuator means for actuating said switch means to effect a deceleration of said driving motor of a following driving member in response to said following driving member catching up with said further member, said switch means being mounted on a respective driving member so as to be actuated by said switch actuator means of a foregoing further member, and wherein means are provided for making said switch actuator means inactive in response to a driving member associated with said further member being disengaged from a carrier vehicle, said further members being connected to an associated driving member by a flexible pull connection means for allowing a respective further member to be moved closely up to its associated driving member.

10. A conveyor system according to claim 8, wherein said means for detecting said normal operational minimum spacing between two consecutive driving members includes detector means operating with wireless signals.

11. A conveyor system according to claim 8, wherein said spacing control means for ensuring the normal operational minimum spacing between two consecutive driving members includes an electrical driving control circuit of the block type provided with means for rendering the power supply to a given driving member inoperative when said given driving member moves into a position in which it is situated with less than said normal operational minimum spacing from a foregoing driving member.

12. A conveyor system according to claim 1, wherein said guiding rail means includes first and second rail length portions, said first rail length portion being exclusively adapted to guide unloaded driving members therealong, said second rail length portion being disposed outside said first rail length portion including means effectively forming part of said spacing control means, said last-mentioned means being solely provided in said second rail length portion.

13. A conveyor system comprising, a plurality of driving members, means for guiding said driving members along a predetermined path, a plurality of movable carriers, means for connecting a respective driving member to a movable carrier, means for controlling the minimum spacing between said movable carriers operatively connected with said drive members, means on said driving members for sensing the load condition thereof, and means operatively connected with said driving member and said control means for rendering inoperative said control means between an unloaded driving member and the foregoing or following drive member.

14. A conveyor system according to claim 13, wherein said means for sensing the load condition of a driving member includes a rod pivotally attached to said driving member and engageable with a foregoing driving member.

15. A conveyor system according to claim 13, wherein said connecting means includes a releasable coupling means for selectively releasably coupling said movable carriers.

16. A conveyor system according to claim 15, wherein said means for sensing the load condition of a driving member includes a rod pivotally attached to said means for releasably coupling said moveable carriers.

17. A conveyor system according to claim 16, wherein means are provided for stopping a drive member when said drive member contacts a foregoing drive member.

18. A conveyor system according to claim 13 wherein said sensing means includes a means for transmitting a signal to detect the presence or absence of a moveable carrier and a means for receiving the transmitted signal.

19. A conveyor system according to claim 18, wherein both said means for transmitting and means for receiving are mounted on said driving member.

20. A conveyor system according to claim 18, wherein means are provided for stopping a drive member when said member contacts a foregoing drive member.

21. A conveyor system according to claim 1, wherein said guiding rail means forms a part of said spacing control means, said guiding rail means including a continuous current rail and an elongated contact rail divided into consecutive sections electrically insulated from each other, said driving members being provided with contact means engageable with said continuous current rail, said contact means being connected to said driving motors for supplying current to said motors, said driving members being further provided with means for causing an electric signal to be transmitted to said contact rail section being passed by said driving member, actuator means disposed behind and electrically connected to said contact rail sections, said actuator means being disposed along said contact rail sections at a distance corresponding to said normal operational minimum spacing and responsive to said electric signal, each of said driving members being further provided with a detector means for detecting said actuator means being responsive to the receipt of said electrical signal supplied by a preceding driving member, said signal detector means being operatively connected with said driving motor of the associated driving member to cause said motor to stop in response to detection of said actuator means responsive to receipt of said electric signal from the preceding driving member.

22. A conveyor system according to claim 21, wherein each driving member is further provided with a sensor means for sensing the load condition thereof, said sensor being operatively connected with said driving motor to render said signal detector means inoperative in response to said driving member being unloaded.

23. A conveyor system according to claim 21, wherein each driving member is further provided with a sensor means, said sensor means being connected with said means for causing an electric signal to be transmitted to said contact rail section to render said means inoperative in response to said driving member being unloaded.

* * * * *